United States Patent [19]

Preston

[11] 4,095,993

[45] Jun. 20, 1978

[54] METHOD FOR PREPARING POLYCRYSTALLINE FIBROUS TIO$_2$ PIGMENT

[75] Inventor: John P. Preston, Toms River, N.J.

[73] Assignee: N L Industries, Inc., New York, N.Y.

[21] Appl. No.: 779,140

[22] Filed: Mar. 18, 1977

[51] Int. Cl.$^2$ .............................................. C09C 1/36
[52] U.S. Cl. .................................. 106/300; 106/306; 106/308 B; 423/615
[58] Field of Search ........... 106/300, 306, 309, 308 B; 423/615

[56] References Cited

U.S. PATENT DOCUMENTS

| | | | |
|---|---|---|---|
| 2,143,851 | 1/1939 | Allan | 423/615 |
| 3,088,840 | 5/1963 | Arkless et al. | 106/300 |
| 3,862,297 | 1/1975 | Claridge et al. | 106/300 |

*Primary Examiner*—Winston A. Douglas
*Assistant Examiner*—J. V. Howard

[57] ABSTRACT

A polycrystalline, fibrous rutile TiO$_2$ pigmentary material having good optical properties and retention in paper, and exceptionally high tinting strength in latex paint systems is prepared by treating a substantially sulfate-free hydrous TiO$_2$, prior to calcination, with a mineralizing complex comprising alkali metal and alkaline earth metal salts, a compound of boron and a rutile promoter sol, and calcining the treated hydrous TiO$_2$ at temperatures in the ranges of from 812°–865° C. followed by washing to remove the calcium ions, milling, hydroclassification and drying; or optionally by a post-calcination treatment for imparting optimum pigmentary properties.

11 Claims, No Drawings

METHOD FOR PREPARING POLYCRYSTALLINE FIBROUS TiO₂ PIGMENT

BACKGROUND OF INVENTION

Titanium dioxide is commonly produced as a white pigment in a finely divided substantially spheroidal form and in either the anatase or rutile modification, and as such is used extensively as a pigment in paint systems, ceramics, plastics and the like. Titanium dioxide has also been produced in fibrous or acicular form in which form it is used extensively as thermal insulating material, and as a reinforcing component in ceramics, cermets, plastic and paper. An acicular or fibrous $TiO_2$ is described in U.S. Pat. No. 3,012,857 wherein $TiO_2$ in the form of fibers having a cross-section of about 1 micron and length of from 0.5 to 1.0 mm were prepared by contacting oxygen with a molten alkalinous metal halide containing a titanium subhalide dissolved therein. This fibrous $TiO_2$ was developed for use as a reinforcing component in paper, plastics and the like. U.S. Pat. No. 3,030,183 also describes production of fibrous $TiO_2$ - in this instance the $TiO_2$ being of the rutile modification and formed by adding titanium tetrachloride and oxygen to an alkali metal or alkaline earth metal halide melt. The use of molten salts to produce fibrous $TiO_2$ is further illustrated by U.S. Pat. Nos. 3,241,922; 3,244,481; 3,338,677 and 3,650,693.

A second approach to the preparation of acicular or fibrous $TiO_2$ is disclosed in U.S. Pat. No. 3,331,660 wherein acicular $TiO_2$ having predominantly either the anatase or rutile crystal modification is prepared by calcining alkali metal deficient titanate fibers at temperatures from 800°–950° C. - the titanate fibers being formed by treating potassium, sodium or other alkali metal titanates with acidic agents, i.e. mineral acids, $TiCl_4$ or chlorine gas. In this connection, the prior art is replete with disclosures relative to processes for making fibrous alkali metal titanates as illustrated by U.S. Pat. Nos. 2,841,470; 3,328,117 and 3,380,847.

Still another approach to making fibrous $TiO_2$ of the rutile or anatase crystal modification is illustrated by U.S. Pat. Nos. 3,329,484 and 3,519,310, each of which describes production of a monocrystalline acicular rutile $TiO_2$ - the former patent by mixing a colloidal suspension of $TiO_2$ nucleating seed particles with an acidic titanium chloride solution and heating the mixture at temperature of at least 190° C., under pressure, to hydrolyze the titanium as acicular $TiO_2$; while the process of the latter patent comprises calcining, in nonflowing solid state, a blended mixture of (a) a preformed $TiO_2$ comprising a seeding amount of rutile $TiO_2$, (b) a salt such as sodium chloride with or without another alkali metal salt and (c) an oxyphosphorous compound - calcination being carried out at temperatures from 725°–1000° C. for from to 10 hours. The calcined product is leached to remove soluble salts.

SUMMARY OF INVENTION

It has now been discovered that a fibrous, polycrystalline $TiO_2$ of the rutile modification having excellent optical properties, good retention in paper and high tinting strength in latex paint systems can be prepared by a relatively simple and inexpensive process wherein a sulfate-free anatase $TiO_2$ hydrate is treated, prior to calcination, with a mineralizing complex comprising an alkali metal salt, an alkaline earth metal salt, a compound of boron and a rutile promoter sol; and the treated hydrate calcined at relatively low temperatures, i.e. in the range of from 812°–865° C., to form a polycrystalline fibrous $TiO_2$ of the rutile crystal modification. The calcine is leached to remove residual calcium ions and then milled and hydroclassified to eliminate particles greater than about 3.0 to 3.5 microns. The cross-section of the individual $TiO_2$ fibers has been found to be in the range of from 0.04 to 0.3 millimicrons and the ratio of length to cross-section in the range from about 1.5 to about 25.0. Moreover, electron micrographs of the individual fibers show that each fiber is polycrystalline, i.e. consists of aggregates or bundles of three or more acicular $TiO_2$ crystals clustered together in a substantially laminar arrangement.

Following hydroclassification, the leached calcine may be flocculated, washed, dried and steam micronized and used without further treatment as a filler in paper. Preferably, however, following hydroclassification, the calcine is given a post-treatment with one or more metal oxides, i.e. $TiO_2$, $SiO_2$ and $Al_2O_3$, according to well-known procedures in the art, followed by drying and steam micronizing. The finished polycrystalline, fibrous rutile $TiO_2$ so produced will have exceptionally good optical properties, and exceptionally high tinting strength in latex paint systems.

PREFERRED EMBODIMENT OF INVENTION

The polycrystalline, fibrous rutile $TiO_2$ pigment of this invention is made by first preparing a substantially sulfate-free anatase $TiO_2$ hydrate by hydrolyzing a titanium sulfate-iron-sulfate solution (produced by sulfuric acid digestion of a titaniferous ore) to precipitate hydrous $TiO_2$ followed by filtering, bleaching and washing, according to well-known techniques, to remove the soluble iron values therefrom. The bleached hydrate will be substantially iron-free but may include from 5 to 15% $H_2SO_4$. The $TiO_2$ hydrate is then desulfated by adding the hydrate to water to form a slurry to which is added a neutralizing agent such as ammonia, ammonium hydroxide or ammonium carbonate in an amount sufficient to adjust the pH of the slurry in the range of from 5 to 10, preferably about 6.5. The slurry is then filtered and the hydrate washed to remove any soluble salts including sulfate values such that the washed hydrate will be substantially sulfate-free, i.e. will contain no more than about 2.0% $SO_3$, calculated on a $TiO_2$ basis.

To this substantially sulfate-free $TiO_2$ hydrate is added, prior to calcination, a mineralizing complex consisting of an alkali metal salt, an alkaline earth metal salt, a compound of boron and a rutile promoter sol. In particular, the alkali metal salt is a potassium salt such as, for example, potassium sulfate or potassium chloride added in amount, calculated as $K_2O$, from 0.0 to 2.0%, preferably 2.0%; the alkaline earth metal is a hydrous calcium salt such as hydrous calcium chloride ($CaCl_2·6H_2O$ or $CaCl_2·2H_2O$) the amount added, calculated as CaO, being from 1.0 to 6.0% and preferably from 4 to 6%. The compound of boron may be a hydrous sodium borate ($Na_2B_4O_7·H_2O$) or boric acid ($H_3BO_3$) the amount added, calculated as $B_2O_3$, being from 0.5 to 2.0% and preferably from 0.5 to 1.0%. The rutile promoter sol is prepared by heating $TiCl_4$ as described, for example, in Barksdale 2nd Edition, pg. 302; and is added in amount of 6.0%; all amounts calculated on a $TiO_2$ basis.

The hydrous $TiO_2$, to which the mineralizing complex of this invention is added, is calcined at relatively low temperatures, i.e. from about 812° to 865° C. to form a calcine comprising polycrystalline, fibrous rutile $TiO_2$ which is leached with water to remove any residual calcium ions and then hydroclassified, dried and milled. The resulting calcine comprises a fibrous $TiO_2$ of the rutile modification comprising from 97.3 to 99.0% $TiO_2$, the individual fibers being polycrystalline and having cross-section in the range of from 0.04 to 0.3 millimicrons and a ratio of length to diameter in the range from about 1.5 to about 25.0. This fibrous pigment may then be flocculated, washed, dried and steam micronized to produce a pigment having high, dry-hiding power and good retention in paper formulations. It is preferred, however, to optimize the pigmentary properties of the fibrous $TiO_2$ for use in latex paint systems and to this end the hydroclassified calcine is given a post-treatment with metal oxides and in particular the oxides of titanium, silicon and aluminum, either singly or in combination, using conventional treatment techniques wherein soluble salts of the aforesaid metals are added to the pigment slurry and the pH of the slurry adjusted to precipitate the soluble salts as the corresponding metal oxides on the pigment. Following treatment the metal oxide coated pigment is dried and then milled, preferably by steam micronizing at a steam to pigment ratio of 5:1 at 90 psig.

The pigments made in accordance with the novel process of this invention were tested for optical properties and retention in paper using the following tests.

Latex Test -

A procedure for determining tinctorial strength (TcS), porosity and spectral characteristics (SCx) of $TiO_2$ in a dry film of latex paint - and is carried out by preparing a large batch of a composite comprising all the ingredients of a white latex paint except the $TiO_2$ pigment and the latex vehicle (Celanese polyvinyl acetate - Celanese Corp. of America, New York, N.Y.). The pigment to be tested is dispersed in the composite and a portion is let down with the latex vehicle to form a white latex paint. A second portion is let down with the latex vehicle which already contains the colorant for preparing a gray latex paint (California Ink 8807B - Black - California Ink Co., San Francisco, Calif.). The white paint panel is used for measuring porosity and the gray paint panel for measuring TcS and SCx - the porosity being the average of the difference in green-filter reflectance between the white test panel and a standard test panel. The TcS is obtained by reading the green-filter reflectance in percent reflectance of the gray test panel and that of a standard test panel - the TcS being arrived at by computing the difference between the two.

Rapid Dry Film for measuring TcS and SCx of $TiO_2$ in a dry film of a gray paint and is carried out by dispersing the pigment in a rapid drying vehicle (Aroplaz 6008-x-50, Ashland Chemical Co., Houston, Texas) containing a predispersed black (Dutch Boy 990 Black - N L Industries, Inc., Perth Amboy, N.J.) on a Hoover muller. The resulting paint is drawn down on gray lacquered chart and allowed to dry. The reflectance values are obtained with a Colormaster Differential Colorimeter and compared to those of a paint prepared from a standard pigment. The green reflectance relative to that of the standard is proportional to the TcS of the test pigment; and the X-blue minus red reflectance is the SCx.

Alkyd Color is a measure of the whiteness of $TiO_2$ as a reflectance and tone value - and is carried out by dispersing the pigment in an alkyd vehicle (Aroplaz 2508 - Archer Daniels-Midland Co., Minneapolis, Minn.) with a Hoover muller and the resulting thick film is drawn down on a high reflectance white panel. The green, red and X-blue reflectance values of the wet film are measured. The green reflectivity value is the measure of the lightness, i.e. "reflectance" of the pigment and the X-blue reflectivity value minus the red reflectivity value is the measure of tone.

The standard or conventional pigment used herein as a control is a commercial grade rutile $TiO_2$ pigment made by the sulfate process.

Retention in Paper Test - Handsheets were prepared on a Noble and Wood Sheet machine using demineralized water and a Raybook P pulp beaten to 31° SR. Proportioner pH varied from 4.4 at high pigment level to 4.5-4.6 at low pigment level. Brightness was evaluated with the Hunter Reflectometer and Opacity with the Bausch and Lamb Opacimeter. Pigment content of the handsheets (% wire retention) was determined by differential ash.

The invention is further described and illustrated by the following examples in each of which the starting material was a sulfate-free $TiO_2$ hydrate prepared as described briefly above and more particularly in accordance with the method disclosed in U.S. Pat. No. 3,632,527.

EXAMPLE 1

Washed titania hydrate prepared as described supra and containing no more than about 2.0% sulfate, calculated as $SO_3$ on a $TiO_2$ basis, was treated, as shown in Table I, with a mineralizing complex consisting of potassium sulfate ($K_2SO_4$) calculated as 2.0% $K_2O$, hydrous calcium chloride ($CaCl_2 \cdot 2H_2O$) calculated as 4.0% CaO, sodium borate ($Na_2B_4O_7 \cdot 10H_2O$) calculated as 1.0 $B_2O_3$ and 6.0% rutile promoter sol. The treated hydrate was then rotary calcined at 853° C. for 1 hour to produce a polycrystalline fibrous rutile $TiO_2$ material.

The calcine was leached calcium-free by washing with water and then ball milled as a 50% solids slurry for 2 hours. The milled pigment was then hydroclassified to remove particles greater than 3.5 microns.

The leached hydroclassified $TiO_2$ comprised a fibrous, polycrystalline, rutile $TiO_2$ which was given a post calcination treatment with 4.0% $SiO_2$ and 2.5% $Al_2O_3$ using treatment techniques wellknown in the art. The post calcination treated fibrous, polylcrystalline $TiO_2$ was then dried and steam micronized at steam to pigment ratio of 5:1 at 90 psig.

The finished fibrous polycrystalline, rutile $TiO_2$ pigment was tested for optical properties using the tests hereinabove described.

As shown in Table II the fibrous $TiO_2$ had good tinctorial strengrh and spectral characteristics in the dry film, good alkyd color, as defined by reflectance and tone, and high tinctorial strength plus good spectral characteristics and porosity in the latex test system. When examined under electron microscope, the cross-sections of the polycrystalline fibers were in the range from about 0.06 to about 0.34 millimicrons and the ratios of length to cross-section in the range from about 3.0 to about 18.9.

EXAMPLES 2-6

Five other portions of the sulfate-free hydrous $TiO_2$ of Example 1 were treated prior to calcination with variations of the mineralizing complex of Example 1, as indicated in Table I, followed by calcining at various temperatures, ball milling, hydroclassification, post-calcination treatment and final milling. As shown in Table II the optical properties of the fibrous, rutile $TiO_2$ pigments were good and the pigments had exceptionally high tinctoral strength and good SCx and porosities in the latex system.

Further, 100 particles of the finished $TiO_2$ pigment of each of Examples 3 and 6 were examined under electron microscope and found to be substantially 100% fibrous and of the following dimensions:

|  | Example 3 | Example 6 |
|---|---|---|
| Cross-Section (d) (millimicrons) | 0.1–0.17 | 0.06–0.34 |
| Ratio 1/d | 6.8–18.9 | 3.0–13.7 |

EXAMPLES 7-8

Two additional portions of the sulfate-free hydrous $TiO_2$ of Example 1 were given precalcination treatments again using variations of the mineralizing complex of Example 1 and various calcination temperatures. Thus, as shown in Table I, in Example 7, the mineralizing complex consisted of 2.0% $K_2O$, 4.0% CaO, 1.0% $B_2O_3$ and 6.0% rutile promoter sol; while the mineralizing complex of Example 8 consisted of 2.0% $K_2O$, 6.0% CaO, 0.5% $B_2O_3$ and 6.0% rutile promoter sol. The pretreated hydrous $TiO_2$ of Example 7 was calcined at 853° C. and that of Example 8 at 842° C. Both calcines were water-leached calcium-free and ball milled at 50% solids for 1 hour. The calcines were not hydroclassified; and the fibrous $TiO_2$ products were given post-calcination treatment with 3.0% $Al_2O_3$ followed by steam micronizing at steam to pigment ratio of 5:1. at 90 psig.

The fibrous $TiO_2$ of each of Examples 7 and 8 were then tested for optical properties both for alkyd color and in latex test system. The test data is shown in Table II.

It will be seen that the finished fibrous pigments of Examples 7 and 8 were superior in optical properties in the alkyd system to the fibrous pigments of Examples 1–6 and had somewhat lower tinctorial strength and porosity but better spectral characteristics in the latex test system.

Further, samples of each of the fibrous $TiO_2$ pigments of Examples 7 and 8 were tested for retention and opacity in paper. Using handsheets, as described in the text above, each of the experimental pigments produced excellent brightness and opacity, i.e. in the range of from 81.7–81.8 and 87.8–88.2, respectively, with from 23 to 27 less pigment than conventional $TiO_2$ pigment; as well as 61 and 63% wire retentions, respectively. These values compare favorably with those of conventional $TiO_2$ pigmentary materials, the opacity and brightness values of which were 82.2 and 82.4, respectively, with a percent wire retention of 66.3.

EXAMPLES 9-11

Again, using the sulfate-free hydrous $TiO_2$ of Example 1, three portions were treated, prior to calcination, with identical mineralizing complex, i.e. 2.0% $K_2O$, 6.0% CaO, 1.0% $B_2O_3$ and 6.0% rutile promoter sol. The pretreated hydrates were calcined at 812° C., 827° C. and 842° C., respectively; then ball milled at 50% solids for 3 hours and hydroclassified to remove particles greater than 3.5 microns. Following leaching to remove the calcium ions, the respective fibrous rutile $TiO_2$ pigments were flocculated, using formic acid, and then steam micronized as in the preceding examples. None of the pigments were post-treated.

As shown in Table II, the optical properties of the pigments, as tested in dry film, were relatively low as compared to those of the pigment samples of the preceding examples. However, the tinctorial strength in latex test system were unusually high, i.e. from 2445 to as high as 2625. Tests were also made of these pigments on dry hiding power in latex paint systems and as shown in Table II, these ranged from 571 to 596 sq. ft./gal. at tinctorial strength from 2430 to 2576. In contrast, the dry hiding power of a standard or conventional $TiO_2$ pigment was only about 446 sq. ft./gal. and the TcS only about 2040. Further, the fibrous polycrystalline rutile $TiO_2$ pigment of Example 10 was examined under electron microscope and found to have cross-sectional dimensions (diameter) ranging from 0.04 to 0.17 millimicrons and a ratio of length to diameter of from 1.8 to 22.0.

EXAMPLES 12-16

The use of the fibrous polycrystalline rutile $TiO_2$ pigment of this invention in aqueous slurries for latex paint systems was also explored and to this end five samples of the sulfate-free hydrous $TiO_2$ of Example 1 were treated, each with a different mineralizing complex - and calcined at various temperatures.

As shown in Table II, the fibrous pigment of Example 12 was prepared by pretreating the hydrous $TiO_2$ with potassium chloride, calculated as 1.0% $K_2O$, hydrous calcium chloride ($CaCl_2 \cdot 2H_2O$) calculated as 6.0% CaO, $H_3BO_3$ calculated as 0.5% $B_2O_3$ and 6% rutile promoter sol. The treated hydrous $TiO_2$ was calcined at 850° C. followed by ball milling at 50% solids for one hour, hydroclassified to separate particles greater than 3.0 microns and then water-leached with $Al_2(SO_4)_3$ and $Na_2SiO_3$ to co-precipitate 1.0% $SiO_2$ and 2.0% $Al_2O_3$ at pH of 11.0 and temperature of 60° C. onto the fibrous $TiO_2$ pigment. The post-treated calcine was steam micronized at a steam to pigment ratio of 5:1. An aqueous slurry of 63.0% solids was prepared on dispersator for a two minute mix at 1500 rpm and when tested for optical properties in a latex system had a tinctorial strength of 2080 and spectral characteristics of 0.9.

Additional data are shown in Table I for latex slurries of fibrous rutile $TiO_2$ pigments prepared in accordance with the instant invention. In Example 13 the hydrate was given the same treatment as in Example 12, was calcined at 828° C. and the calcine post-treated with 2.0% $AlPO_4$ derived from $Al_2(SO_4)_3$ and $H_3PO_4$ and tested as a latex slurry of 57.0% solids for optical properties. As shown in Table II its TcS was 2490 and its SCx 1.2. The calcine of Example 14 was prepared like that of Example 13 and post-treated with 1.0% $TiO_2$ and 2.0% externally prepared $AlPO_4$, the latter derived from $Al_2(SO_4)$ and $H_3PO_4$ and tested as a slurry of 46.0 % solids. As shown in Table II its TcS was 2470 and its SCx 0.4. The mineralizing complex used to treat the hydrate of Example 15 consisted of 1.0% $K_2O$, 4.0% CaO, 0.5% $B_2O_3$ and 6.0% sol and the treated hydrate was calcined at 840° C., post-treated with 3.0% externally prepared $AlPO_4$ and tested as a 46.0% solids slurry for its optical properties in a latex test system. This fibrous rutile $TiO_2$ pigment had an extremely high tinctorial strength in the latex test where the strength was 2893 and its spectral characteristic 0.9. The calcine of Example 16 was prepared using the same mineralizing complex as used in Example 14 but was calcined at somewhat higher temperature (840° C.) and balled milled for 20 hours. Post-calcination treatment was similar to that of Example 15, i.e. 3% AlPO$_4$. An aqueous slurry of 55% solids was prepared and tested in a latex test system - the tinctoral strength of the fibrous pigment was 2500 and its spectral characteristic 0.9. Further, the pigment was evaluated as paper filler and found to be highly effective for producing brightness and opacity equal to those of conventional TiO$_2$ pigments; and when examined under electron microscope had the following dimensions:

| Cross-Section (diameter) (millimicrons) | 0.05–0.25 |
|---|---|
| Ratio Length to Diameter | 1.2–22.6 |

The instant invention thus provides a relatively simple, inexpensive and practical process for producing a fibrous, polycrystalline, rutile TiO$_2$ pigment which has, as a dry pigment, excellent optical properties and hence is useful as a pigment in paint systems including latex paint systems. In addition the relatively high ratio of length to diameter of the individual fibers adapts the fibrous polycrystalline TiO$_2$ to many other uses including filler in paper and reinforcing pigment in cermets, plastics and the like.

While this invention has been described and illustrated by the examples shown, it is not intended to be strictly limited thereto, and other variations and modifications may be employed within the scope of the following claims.

I claim:

1. Process for producing a fibrous, polycrystalline, rutile TiO$_2$ composition wherein the individual fibers have a cross-section dimension in the range of from 0.04 to 0.3 millimicrons and a ratio of length to cross-section in the range of from 1.5 to about 25 comprising the steps of: hydrolyzing a titaniium sulfate-iron-sulfate solution to form a titania hydrate, filtering, bleaching and washing said hydrate to remove the soluble iron salts therefrom, said bleached hydrate being substantially iron-free but containing from 5% to 15% H$_2$SO$_4$ associated with said hydrate, slurrying said hydrate and treating said hydrate with a sufficient amount of an ammoniacal agent selected from the group consisting of ammonia, ammonia hydroxide and ammonium carbonate to neutralize the titania hydrate slurry to a pH of from 5 to 11, washing said titania hydrate to remove the soluble salts therefrom and retaining no more than about 2% SO$_3$ in

TABLE I

FIBROUS POLYCRYSTALLINE RUTILE TiO$_2$ PIGMENTS PREPARED FROM DESULFATED HYDRATE

| Exp. | Mineralizing Complex (%) | | | | Cal. Temp. (C.) | Ball Milling | | Hydro-classification + Micron | Post-Treatment | | | Steam Micronizing |
|---|---|---|---|---|---|---|---|---|---|---|---|---|
| | K$_2$O | CaO | B$_2$O$_3$ | RPS | | Solids (%) | Time (Hr) | | TiO$_2$ | SiO$_2$ | Al$_2$O$_3$ | |
| 1 | 2.0 | 4.0 | 1.0 | 6.0 | 853 | 50 | 2 | 3.5 | 0 | 4 | 2.5 | 5:1 at 90 psig |
| 2 | 2.0 | 5.0 | 1.0 | 6.0 | 862 | 50 | 2 | 3.5 | 0 | 4 | 2.5 | 5:1 at 90 psig |
| 3 | 2.0 | 6.0 | 1.0 | 6.0 | 863 | 50 | 2 | 3.5 | 0 | 4 | 2.5 | 5:1 at 90 psig |
| 4 | 2.0 | 6.0 | 1.0 | 6.0 | 847 | 50 | 2 | 3.5 | 0 | 4 | 2.5 | 5:1 at 90 psig |
| 5 | 0.0 | 6.0 | 0.5 | 6.0 | 863 | 50 | 2 | 3.5 | 0 | 4 | 2.5 | 5:1 at 90 psig |
| 6 | 2.0 | 6.0 | 0.5 | 6.0 | 842 | 50 | 2 | 3.5 | 0 | 4 | 2.5 | 5:1 at 90 psig |
| 7 | 2.0 | 4.0 | 1.0 | 6.0 | 853 | 50 | 1 | (none) | | | 3.0 | 5:1 at 90 psig |
| 8 | 2.0 | 6.0 | 0.5 | 6.0 | 842 | 50 | 1 | (none) | | | 3.0 | 5:1 at 90 psig |
| 9 | 2.0 | 6.0 | 1.0 | 6.0 | 812 | 50 | 3 | 3.5 | | None | | 5:1 at 90 psig |
| 10 | 2.0 | 6.0 | 1.0 | 6.0 | 827 | 50 | 3 | 3.5 | Formic Acid Floc | | | |
| 11 | 2.0 | 6.0 | 1.0 | 6.0 | 842 | 50 | 3 | 3.5 | Formic Acid Floc | | | 5:1 at 90 psig |
| | | | | | | | | | | | | 5:1 at 90 psig |
| | | | | | | | | | | | | Latex Slurries (% Solids) |
| 12 | 1.0 | 6.0 | 0.5 | 6.0 | 850 | 50 | 1 | 3.0 | 0.0 | 1.0 | 2.0 | 63.0 |
| 13 | 1.0 | 6.0 | 0.5 | 6.0 | 828 | 50 | 4 | 3.0 | 0.0 | 0.0 | 2.0 | 57.0 |
| 14 | 1.0 | 6.0 | 0.5 | 6.0 | 824 | 50 | 8 | 3.0 | 1.0 | 0.0 | 2.0 | 54.0 |
| 15 | 1.0 | 4.0 | 0.5 | 6.0 | 820 | 50 | 2 | 3.0 | 0.0 | 0.0 | 3.0 | 46.0 |
| 16 | 1.0 | 6.0 | 0.5 | 6.0 | 840 | 50 | 20 | 3.0 | 0.0 | 0.0 | 3.0 | 55.0 |

TABLE II

PIGMENTARY PROPERTIES OF FIBROUS POLYCRYSTALLINE RUTILE TiO$_2$ INCLUDING LATEX SLURRIES
(Prepared in Re Table I)

| Exp. | Latex System | | | Rapid Dry Film | | Alkyd Color | | |
|---|---|---|---|---|---|---|---|---|
| | TcS | SCx | Porosity | TcS | SCx | Refl. | Tone | |
| 1 | 2250 | 0.5 | −7 | 1570 | 1.1 | 94.2 | −8.2 | |
| 2 | 2125 | 0.5 | −9 | 1560 | 1.0 | 94.3 | −8.2 | |
| 3 | 2475 | 0.1 | −11 | 1485 | 0.8 | 94.2 | −8.3 | |
| 4 | 2275 | 0.6 | −10 | 1530 | 1.2 | 94.1 | −8.0 | |
| 5 | 2235 | 0.5 | −9 | 1490 | 0.8 | 94.2 | −8.6 | |
| 6 | 2300 | 0.9 | −11 | 1520 | 1.5 | 94.3 | −7.8 | |
| 7 | 1980 | 1.1 | −5 | 1670 | 1.4 | 93.7 | −8.0 | |
| 8 | 1950 | 1.5 | −4 | 1565 | 1.5 | 93.8 | −7.6 | |
| Control | — | — | — | — | — | — | — | |
| 9 | 2445 | 1.9 | −8 | 1435 | 4.1 | 93.0 | −8.5 | |
| 10 | 2625 | 1.2 | −7 | 1485 | 3.1 | 92.4 | −8.5 | |
| 11 | 2470 | 0.6 | −8 | 1545 | 2.4 | 92.0 | −9.8 | |
| Control | — | — | — | — | — | — | — | |
| 12 | 2080 | 0.9 | −11 | | | | | Latex Slurries |
| 13 | 2490 | 1.2 | −19 | | | | | |
| 14 | 2470 | 0.4 | −11 | | | | | |
| 15 | 2893 | 0.4 | −15 | | | | | |
| 16 | 2500 | 0.9 | −12 | | | | | |

Handsheets

| Opacity | Brightness | % Wire Retention |
|---|---|---|
| 81.7 | 87.8 | 63.0 |
| 81.8 | 88.2 | 61.0 |
| 82.4 | 87.9 | 66.0 |

| Hiding Power (ft.$^2$/gal.) | TcS |
|---|---|
| 571 | 2430 |
| 573 | 2573 |
| 596 | 2576 |
| 446 | 2040 | said hydrate, calculated on a $TiO_2$ basis, adding to the washed substantially sulfate-free $TiO_2$ hydrate a mineralizing complex consisting essentially of a potassium salt in an amount from 0.0 to 2.0% calculated as $K_2O$, and calcium salt in an amount from 1.0 to 6.0% calculated as CaO, a compound of boron in an amount from 0.5 to 2.0% calculated as $B_2O_3$ and rutile promoter sol in an amount of about 6.0%, all percentages based on the weight of $TiO_2$, calcining the treated hydrate at temperatures in the range of from 812° to 865° C., washing the calcine to remove calcium ions, milling the calcine and optionally hydroclassifying and finishing the milled calcine.

2. Process for producing a fibrous, polycrystalline, rutile $TiO_2$ composition according to claim 1 wherein the milled calcine is hydroclassified to remove particles greater than 3 to 3.5 microns.

3. Process for producing a fibrous, polycrystalline, rutile $TiO_2$ composition according to claim 2 wherein the hydroclassified fibrous $TiO_2$ is finished by coating the fibrous $TiO_2$ with a hydrous oxide selected from the group consisting of $TiO_2$, $SiO_2$, $Al_2O_3$ and mixtures thereof, followed by drying and micronizing.

4. Process for producing a fibrous, polycrystalline, rutile $TiO_2$ composition according to claim 1 wherein the potassium salt is selected from the group consisting of potassium sulfate and potassium chloride.

5. Process for producing a fibrous, polycrystalline, rutile $TiO_2$ composition according to claim 1 wherein the calcium salt is hydrous calcium chloride.

6. Process for producing a fibrous, polycrystalline, rutile $TiO_2$ composition according to claim 1 wherein the compound of boron is selected from the group consisting of hydrous sodium borate and boric acid.

7. Process for producing a fibrous, polycrystalline, rutile $TiO_2$ composition according to claim 3 wherein the hydroclassified fibrous $TiO_2$ is coated with 3% $Al_2O_3$.

8. Process for producing a fibrous, polycrystalline, rutile $TiO_2$ composition according to claim 3 wherein the hydroclassified fibrous $TiO_2$ is coated with from 1 to 4% $SiO_2$ and from 2 to 3% $Al_2O_3$.

9. Process for producing a fibrous, polycrystalline, rutile $TiO_2$ composition according to claim 3 wherein the hydroclassified fibrous $TiO_2$ is coated with 1% $TiO_2$ and 2% $Al_2O_3$.

10. Process for producing a fibrous, polycrystalline, rutile $TiO_2$ composition according to claim 1 wherein a flocculating agent is added to the ball milled calcine to form a calcine floc.

11. Process for producing a fibrous, polycrystalline, rutile $TiO_2$ composition according to claim 10 wherein the flocculating agent is formic acid.

* * * * *